Dec. 4, 1928.
F. W. McKOWN
1,693,653
BATTERY SUPPLY CIRCUIT
Filed Sept. 13, 1927
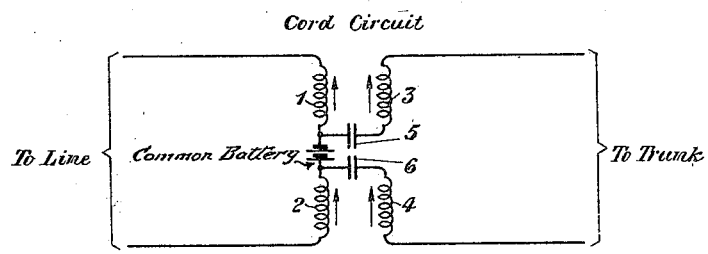
INVENTOR.
F. W. McKown
BY
ATTORNEY Patented Dec. 4, 1928.

1,693,653

UNITED STATES PATENT OFFICE.

FREDERICK W. McKOWN, OF ENGLEWOOD, NEW JERSEY, ASSIGNOR TO AMERICAN TELEPHONE AND TELEGRAPH COMPANY, A CORPORATION OF NEW YORK.

BATTERY SUPPLY CIRCUIT.

Application filed September 13, 1927. Serial No. 219,353.

This invention relates to battery supply circuits, and particularly to circuits used in supplying direct current to subscriber lines in common battery telephone systems. More particularly defined, the circuits to which the invention relates are circuits of the above-named class which include a repeating coil and are designed to supply direct current to only one subscriber line at a time, rather than to two subscriber lines or to one subscriber line and a trunk. An example of this class of circuits is the "B cord circuit" used for connecting an incoming inter-office trunk to a called subscriber in multi-office areas.

In the "B cord circuit" used at the present time for supplying direct current to subscriber lines, one pair of windings of the repeating coil is connected directly to the loop side of the cord circuit, and the battery which furnishes the current is placed between the windings of this pair. The other two windings of the repeating coil are connected directly to the trunk side of the cord circuit, and the only connection between the two sides of the cord circuit is the inductive connection through the windings of the repeating coil. With such an arrangement, the circuit is somewhat susceptible to noise originating in the battery and to cross-talk through the battery.

The object of this invention is to overcome this susceptibility of a battery supply circuit such as the "B cord circuit" to noise and cross-talk.

In general, the applicant associates the repeating coil windings of the battery supply circuit on the trunk side of the circuit with the battery so that noise currents in the two sides of the coil may be made to counteract each other.

The invention will be clearly understood from the accompanying drawing, which shows diagrammatically the essential elements of a "B cord circuit" as improved by the applicant.

With reference to the details of the drawing, the cord circuit is designed to be connected at its left end to the called subscriber's line, and at its right end to the central office trunk. The repeating coil is arranged as a split coil and is connected so that currents flowing in the directions indicated by the arrows will produce flux in one direction. The coil windings 1 and 2 are directly connected in the line side of the cord circuit, and the common battery is connected between these two windings. The windings 3 and 4, which are directly connected in the trunk side of the cord circuit, are also connected, as shown, to the battery, this connection being made through the condensers 5 and 6. The condensers prevent the flow of direct current back into the trunk.

The above disclosure having been made, it will be clear to those skilled in the art that noise from the battery and cross-talk through the battery will not affect the cord circuit, since the repeating coil is so arranged that interfering currents in the windings 1—2 and 3—4 will counteract each other.

What is claimed is:

In a battery supply circuit designed to be connected at one end to a loop and at the other end to a trunk, a split repeating coil having a pair of windings directly connected to the loop side thereof and a pair of windings directly connected to the trunk side thereof, a battery so connected in the circuit as to be between the two windings of each of said pairs of windings, and two condensers connected one between each winding directly connected to the trunk and said battery.

In testimony whereof, I have signed my name to this specification this 12th day of September, 1927.

FREDERICK W. McKOWN.